Aug. 1, 1933.  A. M. JACKSON  1,920,259
METHOD FOR DETERMINING AND MEASURING DISTANCES
Filed July 12, 1929    2 Sheets-Sheet 1
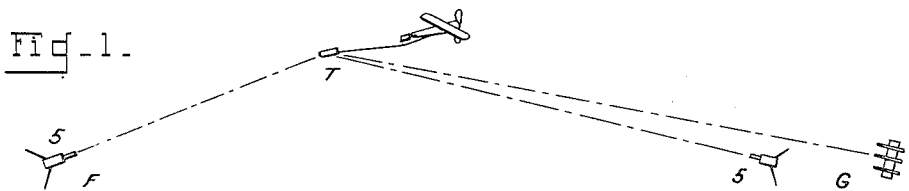
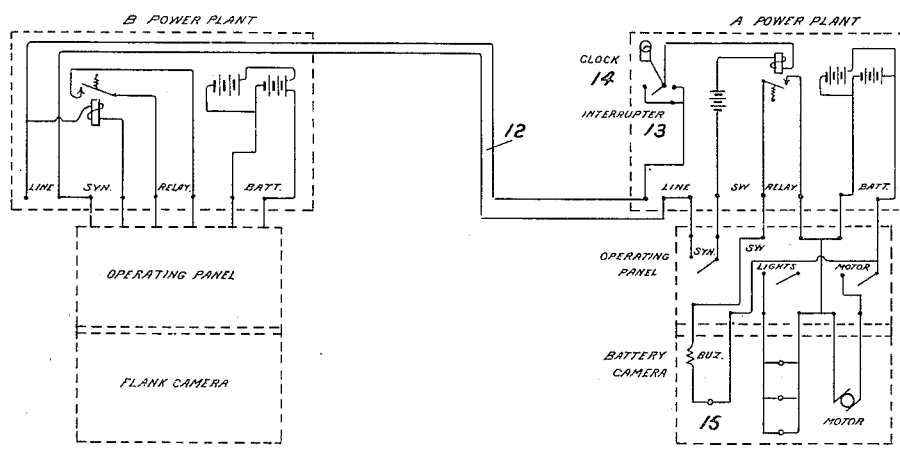
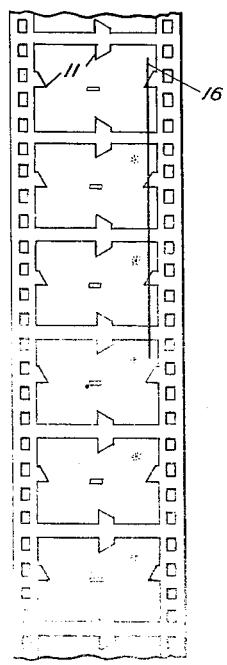
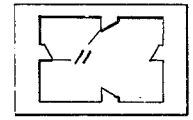
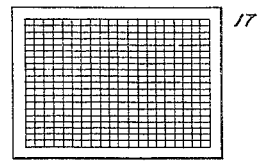
Inventor
Albert M. Jackson

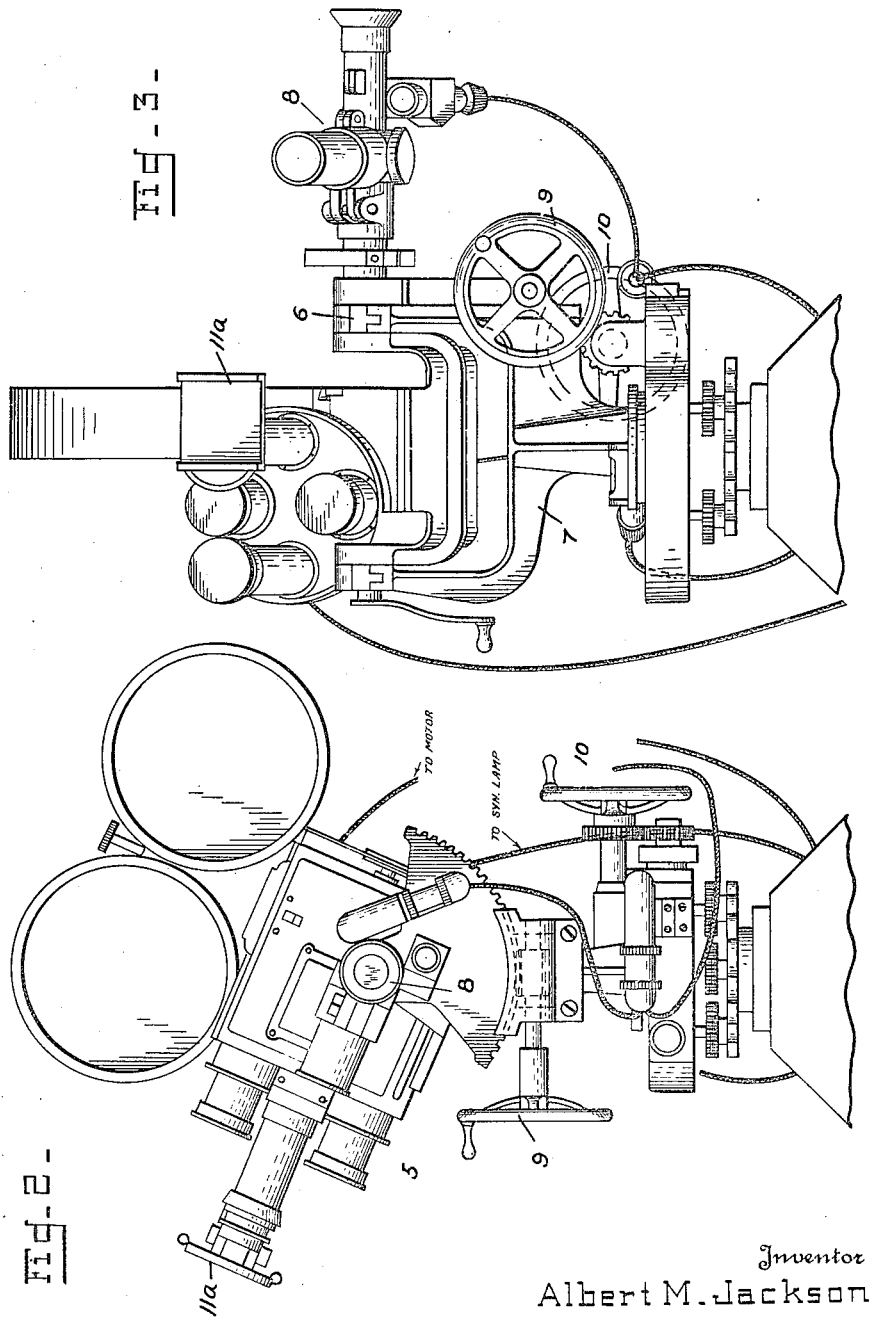

Patented Aug. 1, 1933

1,920,259

UNITED STATES PATENT OFFICE 1,920,259

METHOD FOR DETERMINING AND MEASURING DISTANCES

Albert M. Jackson, United States Army, Brooklyn, N. Y.

Application July 12, 1929. Serial No. 377,898

2 Claims. (Cl. 33—1.)

(Granted under the Act of March 3, 1883, as amended April 30, 1928; 370 O. G. 757)

The invention described herein may be manufactured and used by or for the Government for governmental purposes without the payment to me of any royalty thereon.

This invention relates to a system of and apparatus for determining and measuring distances in three perpendicular planes, being particularly applicable for spotting the burst of a projectile or a luminous trajectory in antiaircraft gunnery.

In antiaircraft gunnery practice, the target consists of a sleeve which is towed at some distance behind an airplane. Inasmuch as the target is free to move in three dimensions, the burst of the projectile may occur to the right or left as a lateral deviation with respect to the plane of fire; it may occur above or below as a vertical deviation with respect to the horizontal plane containing the target; or it may occur short or over as a range or longitudinal function with respect to the vertical plane in the line of flight. The range deviation can only be observed from a flank station, while the vertical deviation is obtainable from either the flank or the gun station, depending on the firing angle.

The visual method heretofore employed in spotting the burst consists in observing the burst from the gun and flank stations through a telescope having a graduated reticule. The observer follows the target through the telescope and as he perceives the burst he calls out the direction and magnitude of the deviation. This data is recorded in chronological order. The defects in this system consist in the inability of the observer to accurately determine the deviations and to call them off in their exact chronological sequence, especially when two or more bursts appear to occur simultaneously; the inability of the recorder to make an accurately timed record of the data transmitted by the observer; the impracticability of synchronizing the records made at the gun and flank stations; and the large amount of time required to plot the data.

The system of spotting which forms the subject of this invention consists essentially in synchronously photographing the burst and target from the gun and flank stations, projecting the negative film on a grid screen and measuring the deviations. The apparatus is characterized by a novel manner of determining a reference point from which to measure the deviation of the image of the shell burst when the image of the target does not appear in the developed film and also by a method of synchronizing the two films so that the two views of each burst may be paired.

Fig. 1 is a diagrammatic view illustrating the system of locating points in space from terrestrial stations and the wiring diagram;

Figs. 2 and 3 are views, respectively, in side and front elevation of a camera and its mounting;

Fig. 4 is a view in elevation of the center indicating mask;

Fig. 5 is a view of a portion of a developed film;

Fig. 6 is a detail view of the screen on which the picture is projected.

Referring to the drawings by characters of reference:

In Fig. 1 there is shown a diagram in which an observing unit is positioned at each end of a base line. The unit G is positioned in the vicinity of the guns whose fire is to be observed with relation to a target T which moves in space along a course which is approximately parallel to the base line. The unit F is on the flank of the gun, usually from 5,000 to 7,000 yards distant.

The observing units are identical and consist of a motion picture camera 5 (see Figs. 2 and 3) mounted for movement in elevation by means of trunnions 6 supported in a rotatable yoke or standard 7. The camera is directed by means of an elbow telescope 8 secured to one of the trunnions and positioned for convenient operation of the elevating handwheel 9 and the azimuth handwheel 10.

The photographic problem consists in photographing three objects, namely, the target, the shell burst and the background. In order to produce sufficient contrast between the shell burst and the background so that the image of the burst is readily distinguishable on the film, it is necessary to use a suitable type of film and filter. This expedient, however, frequently results in suppressing the image of the target. Also in night firing, where the target is illuminated by searchlights, there is not sufficient reflected light to produce even the faintest image of the target on the film. Since the purpose in taking the photograph is to establish a basis for measuring the deviations of the burst with respect to the target, it becomes necessary to establish or indicate a reference point on the film which will represent the target whose image is suppressed.

This is accomplished by adjusting the telescope 8 with its optical axis parallel to the optical axis of the camera lens and by placing indicators or pointers 11 on the four sides of the camera gate 11a in such a manner that they are in fixed position directly in front of the film. The indicators are so arranged that the intersection of lines connecting them will be coincident with the optical axis of the camera. When a sensitized film is exposed, the shadows of the indicators will be recorded on each view or frame and an object (the target) focused on the intersection of the cross hairs of the telescope will appear on each view or frame of the film at the reference point established by the indicators. However, when the image of the target is suppressed, the reference point determined from the image of the indicators establishes a basis for measuring the position of any other object, such as the burst which appears in the view. The accuracy of such measurements is only dependent on the observer's ability to hold the cross hairs of the telescope on the target.

The reels of each camera are normally operated by a motor and the two units are electrically synchronized by means of a relay circuit 12 closed through an interrupter 13 which is actuated by clock work 14. The closing of the circuit by the interrupter is utilized to introduce a time record on to the film. One method of producing such a record consists in arranging a small electric lamp 15 within the camera so that when the circuit is closed the image of a portion of the incandescent film is focused on the margin of the film. In this manner a series of marks 16 are simultaneously produced on the margin of the films of the two cameras and the time of occurrence of any burst may be determined by reference to the first mark of the film.

Referring to Fig. 6, the actual measurement of the angular deviation of each shot, as viewed from each station, is accomplished by projecting the negative film on to a grid screen 17 at a suitable magnification. The images of the indicators are made to coincide with the coordinate axes of the grid and the deviations of the burst are measured from the origin which indicates the position of the target.

The method and apparatus herein outlined proposes a system of spotting which is not only more convenient and accurate in operation than the visual method but affords a simple and rapid manner of determining the deviations.

I claim:

1. A system of determining the deviations in three perpendicular planes of an object with respect to a moving object which consists in taking a motion picture with a camera of the object from the ends of a base line, establishing a reference in front of the film for indicating on each view the optical axis of the camera, directing the cameras through a telescope whose optical axis is parallel to that of the cameras, maintaining the axis of the telescope on the moving object, electrically synchronizing the cameras, producing a time record image on the films and projecting the film on to a grid screen.

2. A system of determining the deviations in three perpendicular planes of an object with respect to a moving object which consists in taking a motion picture with a camera of the objects from the ends of a base line, electrically synchronizing the shutters of the cameras, producing a time record image on the films whereby the films are marked for comparative identity as to time, and then measuring the deviations between the objects on synchronously taken films.

ALBERT M. JACKSON.